US012553075B2

(12) United States Patent
McLean et al.

(10) Patent No.: US 12,553,075 B2
(45) Date of Patent: Feb. 17, 2026

(54) BIOBURDEN ANALYZER WITH ULTRAVIOLET ENHANCEMENT

(71) Applicant: Mettler-Toledo Thornton, Inc., Billerica, MA (US)

(72) Inventors: Robert J McLean, Manchester, NH (US); Anthony C. Bevilacqua, Jr., Medford, MA (US); Kim Perkins, Phoenix, AZ (US); Anjan Reijnders, Groton, MA (US)

(73) Assignee: Mettler-Toledo Thornton, Inc., Billerica, MA (US)

( * ) Notice: Subject to any disclaimer, the term of this patent is extended or adjusted under 35 U.S.C. 154(b) by 392 days.

(21) Appl. No.: 18/203,947

(22) Filed: May 31, 2023

(65) Prior Publication Data
US 2024/0401100 A1 Dec. 5, 2024

(51) Int. Cl.
*C12Q 1/02* (2006.01)
*B01L 3/00* (2006.01)

(52) U.S. Cl.
CPC .......... *C12Q 1/02* (2013.01); *B01L 3/502715* (2013.01); *B01L 2300/0654* (2013.01); *B01L 2300/088* (2013.01); *B01L 2300/168* (2013.01)

(58) Field of Classification Search
CPC ............... C12Q 1/02; B01L 3/502715; B01L 2300/0654; B01L 2300/088; B01L 2300/168
See application file for complete search history.

(56) References Cited

U.S. PATENT DOCUMENTS

| | | | |
|---|---|---|---|
| 5,972,638 A | * | 10/1999 | Burlage ............... F41H 11/132 434/4 |
| 7,812,946 B1 | | 10/2010 | Killinger et al. |
| 8,535,937 B2 | | 9/2013 | Eden |
| 8,628,976 B2 | | 1/2014 | Bolotin et al. |
| 8,647,860 B2 | | 2/2014 | Jiang et al. |
| 9,134,230 B2 | | 9/2015 | Jiang |

(Continued)

FOREIGN PATENT DOCUMENTS

| | | |
|---|---|---|
| CN | 205953587 U | 2/2017 |
| CN | 105424667 B | 2/2019 |

(Continued)

OTHER PUBLICATIONS

Bank, H.L. et al., Bactericidal Effectiveness of Modulated UV Light, Applied and Environmental Microbiology, Dec. 1990, pp. 3888-3889, vol. 56, No. 12, American Society for Microbiology.

(Continued)

*Primary Examiner* — Georgia Y Epps
*Assistant Examiner* — Don J Williams
(74) *Attorney, Agent, or Firm* — Standley Law Group LLP; Jeffrey S. Standley; Adam J. Smith

(57) ABSTRACT

Bioburden analysis devices and related systems and methods are disclosed which utilize ultraviolet (UV) irradiation to enhance accuracy of results. A light source producing UV light is positioned along a passageway for a fluid flow upstream of a laser subsystem. The laser subsystem includes a laser which excites particulate within the fluid and a photo detector which measures fluorescence of the particulate within the fluid. By exposing the particulate to UV light prior to laser excitement, signal to noise ratio is increased, providing more accurate results.

20 Claims, 13 Drawing Sheets

(56) References Cited

U.S. PATENT DOCUMENTS

| | | | |
|---|---|---|---|
| 9,797,823 | B2 | 10/2017 | Yamasaki et al. |
| 9,915,600 | B2 | 3/2018 | Walls et al. |
| 11,119,027 | B2 | 9/2021 | Sekimoto |
| 2007/0190593 | A1 | 8/2007 | Abbaszadegan et al. |
| 2011/0020855 | A1* | 1/2011 | Shinoda ............ G01N 15/1484 435/29 |
| 2011/0036995 | A1 | 2/2011 | Binnie et al. |
| 2015/0346077 | A1 | 12/2015 | Sekimoto |
| 2017/0038299 | A1 | 2/2017 | Long et al. |
| 2017/0205348 | A1 | 7/2017 | Obara et al. |
| 2021/0262938 | A1 | 8/2021 | Falzarano et al. |

FOREIGN PATENT DOCUMENTS

| | | | |
|---|---|---|---|
| CN | 210269601 U | 4/2020 | |
| CN | 115124181 A | 9/2022 | |
| EP | 3546924 A1 | 10/2019 | |
| JP | 2004-66045 A | 3/2004 | |
| JP | WO-2011099861 A1 * | 8/2011 | ............ C12Q 1/04 |
| JP | 6244080 B2 | 12/2017 | |
| WO | WO-2011044474 A1 * | 4/2011 | ............ G01N 21/05 |

OTHER PUBLICATIONS

Hasegawa, N., Quantitative Comparison of the Autofluorescence of Bacteria and Polystyrene Microspheres under Violet Wavelength Excitation for Verification of Fluorescence-based Bioaerosol Detector Results, Biocontrol Science, 2013, pp. 211-215, vol. 18, No. 4.

Li, R. et al., A tryptophan synchronous and normal fluorescence study on bacteria inactivation mechanism, PNAS, Sep. 17, 2019, pp. 18822-18826, vol. 116, No. 38, published online Sep. 3, 2019 at www.pnas.org/cgi/doi/10.1073/pnas.1909722116.

Li, R. et al., In situ detection of live-to-dead bacteria ratio after inactivation by means of synchronous fluorescence and PCA, Jan. 23, 2018, pp. 668-673, vol. 115, No. 4, published online Jan. 8, 2018 at www.pnas.org/cgi/doi/10.1073/pnas.1716514115.

Surre, J. et al., Strong increase in the auto fluorescence of cells signals struggle for survival, Scientific Reports, 2018, pp. 1-14, published online Aug. 14, 2018 at www.nature.com/scientificreports/.

3M, Food Safety, Fast colony counting, 3M Food Safety Lab Automation—moving food testing forward, https://www.3m.com/3M/en_US/food-safety-us/foodandbeveragetests/lab-automation/, URL accessed May 31, 2023, 2023, 7 pages.

Analytik Jena GMBH+Co. KG, UVP ColonyDoc-It, Colony counting made easy, https://www.uvp.com/products/bioimaging-systems/basic-imaging-systems/uvp-colonydoc-it/, URL accessed May 31, 2023, 2023, 6 pages.

Anders, H.-J et al., Practical Application Of Online Water Bioburden Analyzers In Pharmaceutical Manufacturing, Pharmaceutical Online, Guest Column Jul. 24, 2017, 3 pages.

Cundell, T., Microbial Monitoring of Pharmaceutical Grade Water Systems—Common Misconceptions, American Pharmaceutical Review, Oct. 11, 2018, 7 pages.

Labrepco, Accuris E3000 UV Transilluminator for Electrophoresis Gels, https://www.labrepco.com/product/accuris-e3000-uv-transilluminator-for-electrophoresis-gels/, URL accessed May 31, 2023, 2023, 3 pages.

Mao, Y. et al., Characterization of bacterial fluorescence: insight into rapid detection of bacteria in water, Water Reuse, Aug. 6, 2021, vol. 00, No. 0, 2, Corrected Proof, 11 pages.

Martindale, C. et al., Microorganism Challenges On Online Water Bioburden Analyzers: Pitfalls & Best Practices, Pharmaceutical Online, Guest Column Mar. 2, 2020, 3 pages.

Mettler Toledo, Microbial Detection Analyzer 7000RMS, Real-time Monitoring of Bioburden in Water, https://www.mt.com/us/en/home/products/Process-Analytics/Total-Organic-Carbon-TOC-analyzer/thornton-bioburden-analyzer.html, URL accessed May 31, 2023, 7 pages.

Prasad, A. et al., Biofluorescent particle counter-based real-time feedback and control of processing conditions, European Pharmaceutical Review, Sep. 3, 2019, 11 pages, Issue 4 2019.

Rapid Test Methods Ltd., BioVigilant—IMD-W—Online Water Bioburden Analyser, Rapid Microbiology, https://www.rapidmicrobiology.com/products/imd-w-online-water-bioburden-analyser, URL accessed Jul. 27, 2022, 2022, 5 pages.

* cited by examiner

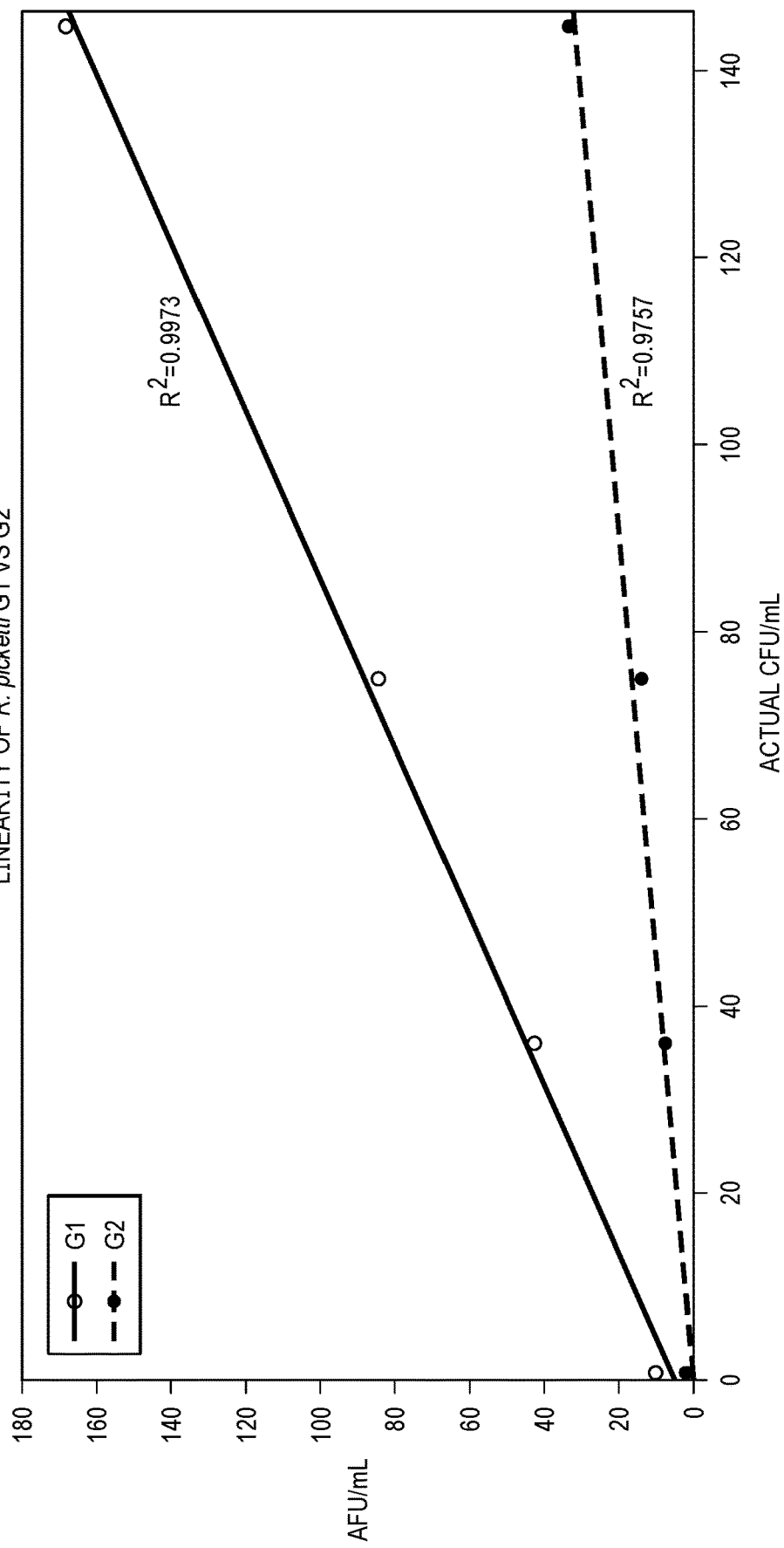

BIOBURDEN ANALYZER WITH ULTRAVIOLET ENHANCEMENT

CROSS-REFERENCE TO RELATED APPLICATIONS

This application is filed as original and makes no priority claim.

TECHNICAL FIELD

Exemplary embodiments relate generally to bioburden analysis devices with ultraviolet enhancements, such as to improve signal to noise ratio.

BACKGROUND AND SUMMARY OF THE INVENTION

Various needs exist for highly sanitary liquids, such as water. The finished water required for the pharmaceutical market is one such example. Bioburden analysis techniques are known, such as plate or colony counting. However, colony counting has shortcomings, including the time needed to complete testing and inaccuracies in measured levels. More recently, bioburden analysis devices have been introduced which utilize laser excitement to induce fluorescence in microbiological contamination which is optically sensed to determine bioburden. Examples of such devices and related technology include the Bioburden Analyzer 7000RMS Online available from Metter Toledo (www.mt.com/us/en/home/products/Process-Analytics/Total-Organic-Carbon-TOC-analyzer/thornton-bioburden-analyzer.html) and/or the disclosures of U.S. Pat. No. 9,134,230, which is hereby incorporated by reference. Existing laser-based solutions may excite and/or detect particulate in liquid streams other than microbiological organisms, such as microplastics or rouge. This may result in detection of background noise, in contrast to desired microbiological signal data. Thus, it remains desirable to improve accuracy of such devices, such as by improving signal to noise ratio of microbiological signals.

Bioburden analysis devices which utilize ultraviolet light to enhance readings are disclosed, along with related systems and methods. A fluid sample may be passed by one or more light sources which produce ultraviolet (UV) light prior to laser exposure and fluorescence detection. The pre-laser-excitement exposure to UV radiation may increase fluorescence, such as autofluorescence, of microbiological contamination. While the mechanism of enhanced fluorescence is not entirely well understood, it may be caused by partial or full denaturing within microbes. Advantageously, other particulate, which might be excited by the laser and detected as contamination, may be unaffected by such UV light exposure. This may improve the resulting signal to noise ratio, resulting in more accurate analysis. Additionally, or alternatively, certain viable but non-culturable organisms may exhibit enhanced fluorescence following such UV exposure which may then be detected by the disclosed devices, systems, and/or methods which may not be otherwise detectable, or readily detectable, under conventional solutions.

In other exemplary embodiments, without limitation, the sample may be exposed to UV light in a same or similar fashion prior to manual colony counting and/or at least partially automated colony counting using one or more machine vision devices.

In exemplary embodiments, a sample stream may be diverted into a tubular passageway which is helically arranged about a UV lamp prior to laser light exposure and fluorescence detection. The helical arrangement may permit adequate UV light penetration and exposure time to enhance fluorescence detection with a high level of efficiency. However, other size, shape, and/or configurations of passageways may be provided.

The passageway may comprise one or more UV light transparent or highly transmissive materials, such as but not limited to fused silica. Various light sources which emit UV light may be utilized, such as but not limited to mercury lamps, light emitting diodes (LEDs), and/or excimer lamps. Multiple passageways and/or lights of various size, shape, number, type, and/or configurations may be utilized. The disclosed devices, systems, and methods may be used for detecting bioburden of water or any other type or kind of fluid, such as but not limited to air or other gases. The disclosed devices, systems, and methods may permit results to be determined and/or presented in substantially real time, though such is not required.

Certain exemplary embodiments are described, without limitation. A bioburden analysis system includes a passageway for a flow of a fluid, an ultraviolet (UV) light source positioned along a first portion of the passageway for irradiating particulate within the fluid with UV light when activated, and a laser subsystem positioned along a second portion of the passageway downstream of the first portion of the passageway. The laser subsystem including at least one laser for exciting the particulate within the fluid, and at least one photo detector for measuring fluorescence of the particulate within the fluid.

The first portion of the passageway extends about the UV light source. The UV light source emits UV light when activated. At least the first portion of the passageway at least primarily comprises a UV transparent or translucent material.

The first portion of the passageway is located less than 10 mm from the UV light source, in exemplary embodiments, without limitation.

The first portion of the passageway comprises multiple windings helically arranged about the UV light source.

The first portion of the passageway comprises an internal diameter on a same order of magnitude as a depth of the UV penetration into the fluid from the light source when activated.

The UV transparent or translucent material comprises fused silica, quartz and/or diamond.

The first portion of the passageway is configured to provide a flow rate of the fluid from about 0.01 µL/min to about 500 mL/min.

The first portion of the passageway is configured to maintain the fluid within irradiation distance of the UV light source for a time period from about 5 to 90 seconds, such as on a continuous basis. The UV light source may be configured to provide continual illumination or discontinuous illumination (e.g., flash or pulse) over a period of time or continuously. For example, the UV light source may be activated continuously or for a period of several seconds to provide the irradiation. As another example, without limitation, the UV light source may flash, where each flash is under 1 second, by way of non-limiting example, and occur over a longer period of time (e.g., 5 to 90 seconds, continuously, etc.) to provide the irradiation.

The passageway comprises a sample line extending from a main fluid passageway forming part of a larger system. The system is configured to accommodate a continuous flow of the fluid through the sample line.

A controller is configured to receive fluorescence data from the laser subsystem and record bioburden levels in a continuous manner in substantially real-time for the continuous flow of the fluid through the sample line.

The light source comprises multiple lighting elements, each configured to produce UV light. The first portion of the passageway extends in a linear fashion adjacent to each of the multiple lighting elements. The multiple lighting elements may be arranged in a helical fashion about the first portion of the passageway. Alternatively, the multiple lighting elements may be arranged in a linear fashion along the first portion of the passageway.

An enclosure is provided about the light source and the first portion of the passageway. Reflective material may be provided at the enclosure for reflecting emitted UV light inward. The enclosure may provide a liquid-tight seal for a bath of the fluid and the UV light source may extend within at least a portion of the enclosure.

In other exemplary embodiments, without limitation, a real-time bioburden analysis system a sample feed line configured to receive a portion of a flow of a liquid for testing, a light source comprising one or more lighting elements, each configured to produce ultraviolet (UV) light comprising 185 nm wavelength positioned along the sample feed line to irradiate the liquid traveling thereby, a laser subsystem positioned along the sample feed line at a downstream position relative to the light source and comprising a laser directed towards the liquid traveling thereby and a photo detector configured to measure fluorescence of at least certain particulate within the irradiated and excited liquid passing thereby, and a controller configured to receive data from the photo detector to measure bioburden in substantially real-time.

A portion of the sample feed line is coiled about the light source in a spiral having multiple windings. An enclosure is provided about the portion of the sample feed line coiled about the light source and the light source. A distance between the light source and the portion of the sample feed line coiled about the light source is less than 10 mm. The portion of the sample feed line coiled about the light source primarily comprises fused silica and/or quartz.

In other exemplary embodiments, without limitation, a method for detecting biological contamination in a fluid includes providing a sample flow of a fluid within a sample line, irradiating the sample flow of the fluid with ultraviolet (UV) light from a light source comprising one or more lighting elements positioned along the sample line, exciting particulate within the sample flow of the fluid by way of a laser positioned downstream of the light source to cause or increase fluorescence of at least microbiological portions of the particulate within the sample flow of the fluid, and measuring the fluorescence of the particulate within the sample flow of the fluid by way of a photo detector.

The method may further include electronically recording detected levels of the fluorescence of the sample flow of the fluid in substantially real time.

A portion of the sample line is coiled about the light source in a spiral in multiple windings. A distance between the light source and the sample line is less than 10 mm. The portion of the sample feed line coiled about the light source primarily comprises fused silica and/or quartz. The sample flow of the fluid is continuous for at least a period of time.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 12 is another graphical representation of exemplary results from the system compared to non-UV enhanced analysis.

DETAILED DESCRIPTION OF EXEMPLARY EMBODIMENT(S)

Figure 1A:
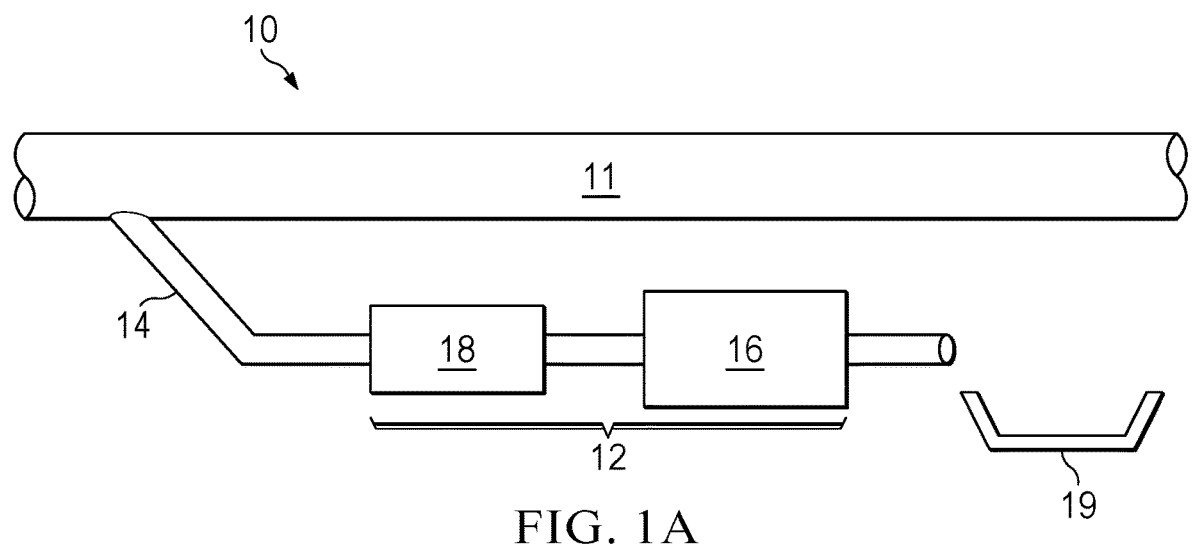
FIG. 1A is a simplified plan view of an exemplary system for analyzing bioburden utilizing ultraviolent enhancement.
Figure 1B:
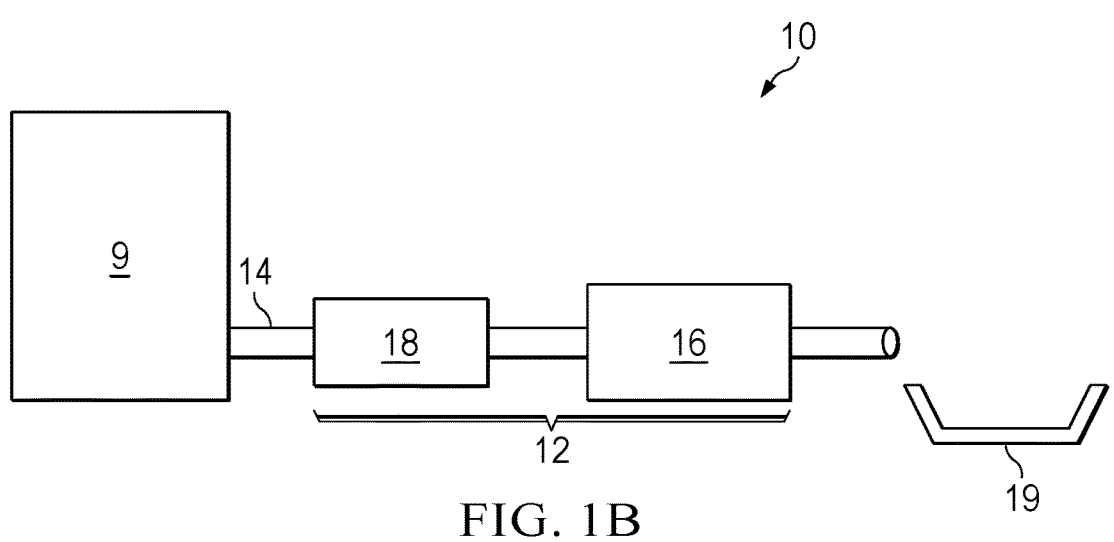
FIG. 1B is a simplified plan view of another exemplary embodiment of the system for analyzing bioburden utilizing ultraviolent enhancement.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIGS. 1A-1D illustrates an exemplary system 10 for analyzing bioburden. As illustrated with particular regard to FIG. 1A, one or more sample fluid passageways 14 may extend from one or more fluid transport passageways 11. The fluid transport passageways 11 may comprise pipelines ductwork, and/or other passageways for transporting or otherwise conveying water (purified or unpurified) or other liquids, air or other gasses, combinations thereof, or the like. The fluid transport passageways 11 may form part of one or more larger systems or processes, such as but not limited to, for industrial manufacturing.

The system 10 may comprise a bioburden analysis device 12 (hereinafter also "device" for brevity). The device 12 may be placed along the sample fluid passageway(s) 14. The sample fluid passageways 14 may convey or otherwise transport a side or sample stream from that which is conveyed or otherwise transported in the fluid transport passageway 11, though in other exemplary embodiments device 12 may be directly coupled to the fluid transport passageway 11 such that a separate sample fluid passageway 14 is not required.

As illustrated with particular regard to FIG. 11B, in other exemplary embodiments, without limitation, fluid may originate from a storage container 9, or an ambient environment. A separate sample fluid passageway 14 may be utilized to connect with the storage container 9 or the ambient environment, though such is not required. For example, without limitation, fluid may be periodically, continuously, or the like conveyed form the storage container 9 to the device 12 for analysis.

Figure 1C:
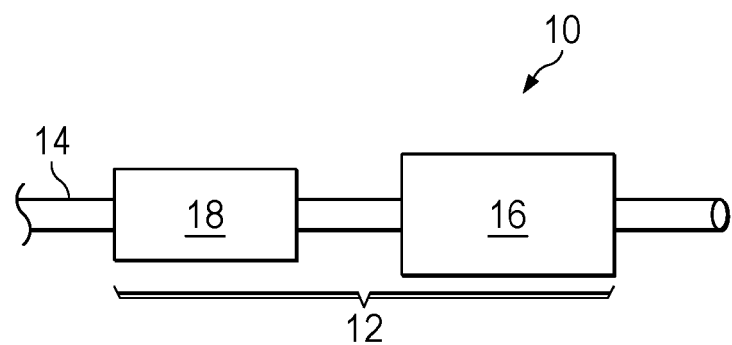
FIG. 1C is a simplified plan view of another exemplary embodiment of the system for analyzing bioburden utilizing ultraviolent enhancement.

As illustrated with particular regard to FIG. 1C, in other exemplary embodiments, without limitation, the device 12 may be configured to receive fluids directly from the storage container 9 or an ambient environment. This may be accomplished with or without the fluid transport passageway 11, sample fluid passageway(s) 14, and/or need for a separate waste repository 19. For example, without limitation, the device 12 may be placed within a bath of fluid, pump in ambient air, combinations thereof, or the like Control of the fluid to be analyzed into the sample fluid passageway 14 and/or to the device 12 from the fluid transport passageways 11, storage container 9, ambient environment or otherwise may be controlled by valves, pumps, gravity, fluid pressure, size or other characteristics of connections, pressurization of the fluids, combinations thereof, or the like. Samples may be diverted into the sample fluid passageway(s)14, device 12, and/or otherwise gathered continuously, periodically, randomly, combinations thereof, or the like. Such diversion and/or collection may be electronically and/or manually controlled.

After analysis, fluid may be deposited into a waste repository 19 and/or passed back into the system 10, such as to the fluid transport passageway 11 by way of the sample fluid passageway 14 and/or to the ambient environment.

The device 12 may comprise an excitation and fluorescence detection subsystem 16 (hereinafter the "laser subsystem" for brevity). The laser subsystem 16 may comprise one or more lasers, optical elements (e.g., filters, lenses, collimators, mirrors, light guides, combinations thereof, or the like), and/or optical sensors (e.g., photomultiplier tube). The laser subsystem 16, by way of non-limiting example, may include some or all components and/or technologies of the Bioburden Analyzer 7000RMS Online available from Metter Toledo (www.mt.com/us/en/home/products/Process-Analytics/Total-Organic-Carbon-TOC-analyzer/thornton-bioburden-analyzer.html) and/or shown and/or described in U.S. Pat. No. 9,134,230, which is hereby incorporated by reference as if fully restated herein. While laser excitation and optical detection are discussed, other forms of electromagnetic excitation and/or detection may be utilized.

The device 12 may comprise a fluorescence enhancement subsystem 18, which may be provided upstream of the laser subsystem 16. The fluorescence enhancement subsystem 18 may comprise one or more light sources 22 configured to emit UV light to enhance fluorescence, such as autofluorescence, of irradiated particulate within the fluid. Stated another way, the laser subsystem 16 may be downstream of the fluorescence enhancement subsystem 18. In this way, fluorescence enhancement may precede laser excitation and fluorescence detection to enhance signal to noise ratios.

Figure 1D:
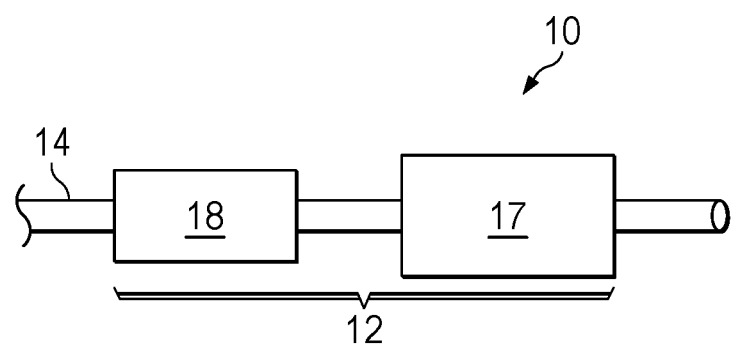
FIG. 1D is a simplified plan view of another exemplary embodiment of the system for analyzing bioburden utilizing ultraviolent enhancement.

As illustrated with particular regard to FIG. 1D, in other exemplary embodiments, without limitation, the device 12 may comprise a colony counting subsystem 17 positioned upstream of the fluorescence enhancement subsystem 18. The colony counting subsystem 17 may include one or more components for use with manual colony counting and/or related protocols (e.g., sample dishes, markers, combinations thereof, or the like). Alternatively, or additionally, the colony counting subsystem 17 may include one or more at least partially automated devices, such as which utilizes machine vision to count colonies.

Figure 2A:
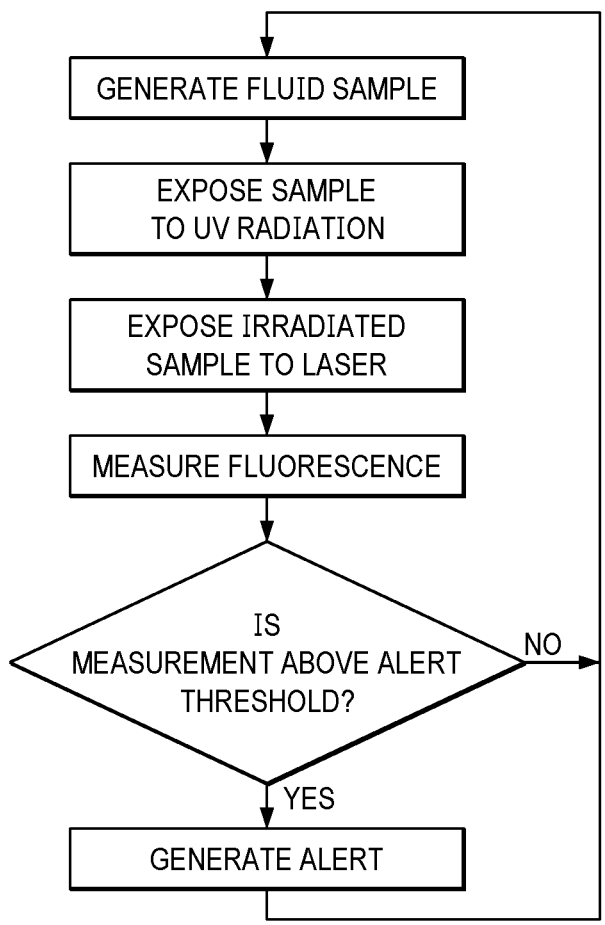
FIG. 2A is a flow chart with exemplary logic for operating the system of any one of FIGS. 1A-1C.
Figure 2B:
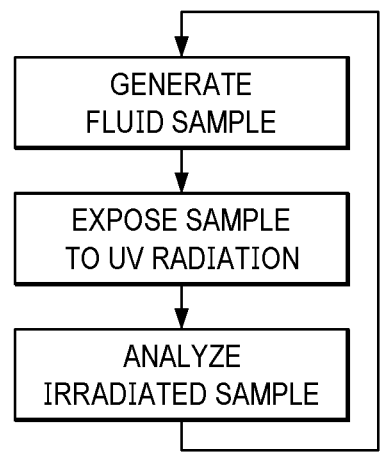
FIG. 2B is a flow chart with other exemplary logic for operating the system of any one of FIGS. 1A-1D.

As illustrated with particular regard to FIG. 2A-2B, fluid in the fluid transport passageway 11 may be diverted into the sample fluid passageway 14, such as on a periodic, random, and/or continuous basis and/or otherwise. As illustrated with particular regard to FIG. 2A, the laser subsystem 16 may be utilized for excitement and analysis of bioburden within the fluid after UV exposure at the enhancement subsystem 16. As illustrated with particular regard to FIG. 2B, additionally or alternatively, the colony counting subsystem 17 may be used after UV exposure at the enhancement subsystem 16 to manually and/or at least partially automatically analyze and report bioburden levels.

Regardless, analysis results may be stored and/or displayed, locally and/or remotely. Where certain predetermined thresholds are exceeded, alerts may be generated, such as locally and/or remotely. Such alerts may include electronic notifications. Various protocols for the larger systems and/or processes may be triggered, such as automated shutdown and/or sanitation procedures, where the certain predetermined thresholds are exceeded, though such is not required. Alerting steps shown and/or described are not necessarily required and/or may be performed as separate subroutines.

After analysis, fluids may be deposited into one or more waste repositories 19, returned to the transport passageway 11, the ambient environment, or the like FIG. 3 through FIG. 9 illustrate various exemplary, non-limiting, embodiments of the fluorescence enhancement subsystem 18. The fluorescence enhancement subsystem 18 may comprise one or more internal fluid passageways 20 and one or more light sources 22. The internal fluid passageways 20 (also "fluid passageways 20") may be part of, or separate from, the sample fluid passageway 14. The fluid passageway(s) 20 may be provided in close proximity to the light source(s) 22, such as to provide irradiation from the light source(s) 22 to fluid within the passageway(s) 20.

While described as internal fluid passageways 20 in some instances, the fluid passageways 20 may extend beyond the light source(s) 22 and accompanying enclosures 26, though such is not required. Furthermore, the fluid passageways 20 need not necessarily be separate from the sample fluid passageway 14. Stated another way, at least a portion of the sample fluid passageway 14 may serve as the fluid passageways 20.

The light source(s) 22 may emit UV light when sufficiently powered. The UV light may comprise, but is not necessarily limited to UV-C type light, though any type of UV light may be used, such as comprising light between 120 and 255 nm by way of non-limiting example, more preferably 185 nm. The light source(s) 22 may comprise UV lamps (e.g., mercury lamps), LEDs, excimer lamps, combinations thereof, or the like. In exemplary embodiments, without limitation, two UV lamps are utilized. In other exemplary embodiments, without limitation, a high output UV lamp (e.g., >20 watts) is utilized which operates at 185 nm. Any number, type, kind, and/or arrangement of light source(s) 22 may be utilized.

The fluid passageway(s) 20 may be secured in close proximity to the light source(s) 22. In exemplary embodiments, without limitation, the fluid passageway(s) 20 are maintained at a distance between about 3 mm and 9 mm from the light source(s) 22, more preferably 5 mm, and preferably under 10 mm.

In exemplary embodiments, without limitation, a first set of one or more structures may secure the passageway(s) 20 and a second set of one or more structures may secure the light source(s) 22. The second set of one or more structures may permit removal of the light source(s) 22 such as for repair or replacement, preferably without the need for disturbing and/or repositioning the fluid passageway(s) 20. In exemplary embodiments, without limitation, the first and second set of one or more structures may be the same and/or part of a common structure.

In exemplary embodiments, the enclosure 26 may include an aperture for the light source 22 which may be slidably removed therefrom, such as for maintenance and/or replacement. The light sources 22 and/or fluid passageways 20 may be secured by one or more set screws, clamps, combinations thereof, or the like. Alternatively, or additionally, the enclosure 26 may comprise multiple portions, at least some of which are removable and/or moveable relative to one another, such as to secure and/or release the light sources 22 and/or fluid passageways 20.

Figure 8:
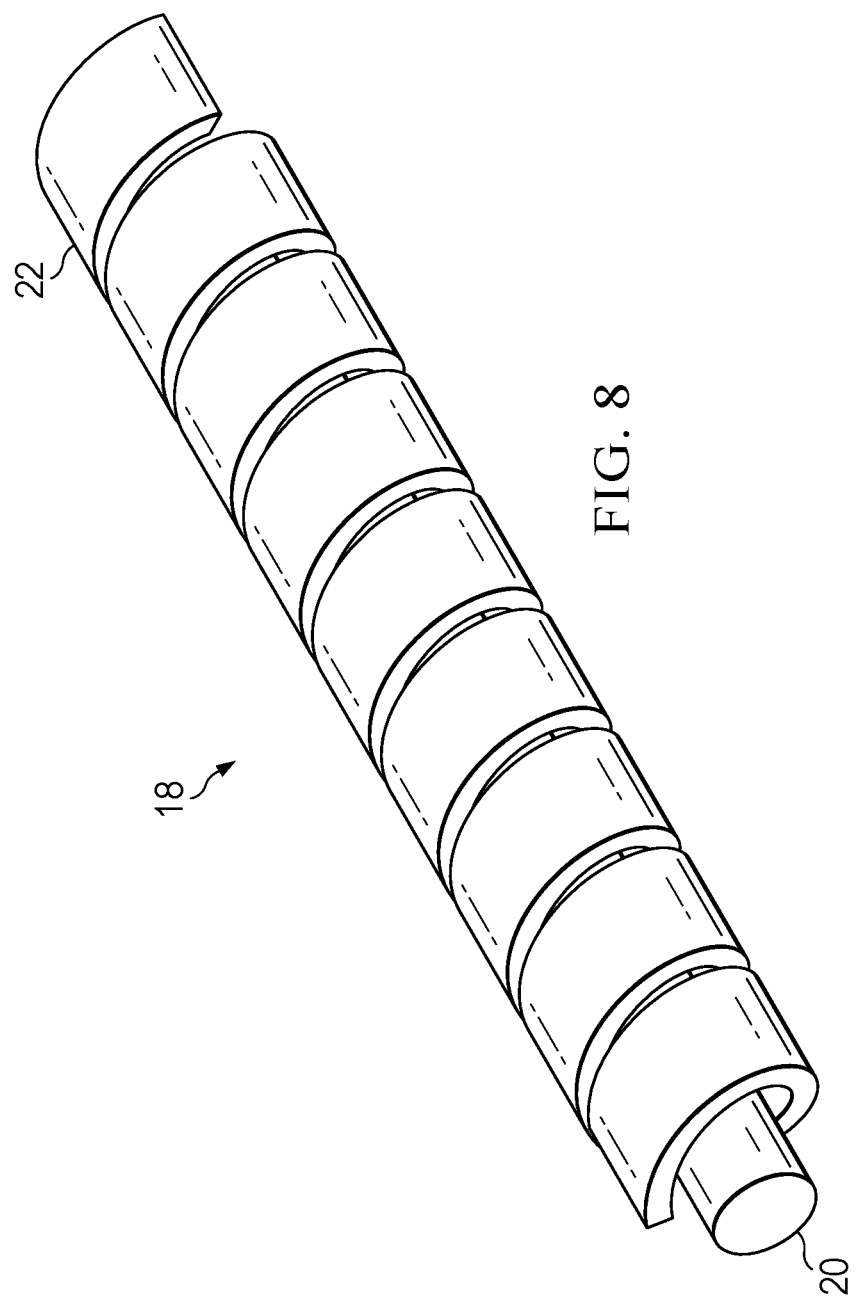
FIG. 8 is a perspective view of another exemplary embodiment of certain components of the UV enhancement subsystem for the system of any one of FIGS. 1A-1D.

The fluid passageway(s) 20 and/or light source(s) 22 may be provided in various arrangements. For example, without limitation, the fluid passageway(s) 20 may be helically arranged about the light source(s) 22, such as illustrated with particular regard to FIGS. 3-6. As another example, without limitation, a plurality of light sources 22 may be provided, such as in a sleeve, along a fluid passageway 20 as illustrated with particular regard to FIG. 7. For example, without limitation, one or more relatively linear fluid passageway 20 may be surrounded by one or more relatively linear light sources 22A-D. However, any number, arrangement, size, shape, and/or type of light sources 22 and/or fluid passageways 20 may be utilized. FIG. 8, as another non-limited example, illustrates an embodiment where the light source 22 comprises multiple lights arranged helically about a relatively linear fluid passageway 20.

As yet another example, without limitation, one or more light sources 22 may be placed adjacent to one or more sinuously arranged passageways 20 (e.g., coil, loop, zig-zag, single turn, curved passageway, combinations thereof, or the like). Alternatively, or additionally, the passageways 20 may comprise one or more baffles or other obstructions or characteristics (e.g., diameter or cross-sectional changes, directional changes, combinations thereof, or the like) configured to slow a flow rate of the fluid therein.

In exemplary embodiments, without limitation, the passageways 20 may be configured to provide flow rates of about 0.01 µL/min to about 500 mL/min, and more preferably about 30 mL/min, though any flow rate may be utilized. In exemplary embodiments, without limitation, the passageway(s) 20 may be configured to provide approximately 5 seconds to 90 seconds of exposure to UV irradiation by the light source(s) 22 under normal system operations, and more preferably about 20 to 40 seconds, though the enhancement subsystem 18 may be configured to provide any amount of exposure time. The amount of exposure time may be dependent upon and/or varied based on intensity of the UV radiation. For example, without limitation, the passageway(s) 20 may be configured to provide approximately 15 to 60 seconds of exposure to UV irradiation by the light source(s) 22 under normal system operations where the light source(s) 22 comprise higher output lamps (e.g., >20 watts). The light source(s) 22 may be configured to be illuminated for a given dosage by activating the light source(s) 22 for a period of time on a continuous basis (e.g., several seconds) or discontinuous basis (e.g., flash and/or pulse) over a period of time. Whether operated to provide continuous or discontinuous light, the light source(s) 22 may be operated continuously (e.g., always on) or periodically (e.g., turned on and off, set to flash for a period of time, etc.). For example, without limitation, the light source(s) 22 may operate continuously over approximately a 5 to 90 second duration for each sample. As another example, without limitation, the light source(s) 22 may be operated to flash and/or pulse for a same or different, preferably shorter, duration over a period of time, continuously, or the like. In exemplary embodiments, without limitation, the light source(s) 22 are operated continuously when the system 10 is operated with a continuous flow. In other exemplary embodiments, without limitation, the light source(s) 22 are operated periodically (e.g., on demand) when the system 10 is operated in a discontinuous (e.g., sample) mode.

The enhancement subsystem 18 may comprise one or more electronic controllers for controlling operation of the enhancement subsystem 18, such as but not limited to, the light source(s) 22. In exemplary embodiments, such controller(s) may control light source(s) 22 power supply, activation, deactivation, illumination strength, illumination time, combinations thereof, or the like. Such controller(s) may also, or alternatively, control flow through the enhancement subsystem 18, such as by way of one or more valves, pumps, or the like. The controller(s) may be dedicated to the enhancement subsystem 18 and/or shared with the laser subsystem 16. The controller(s) for one or both of the enhancement subsystem 18 and/or the laser subsystem 16 may be local to such components or remote therefrom.

The fluid passageways 20 may be any size and/or shape. An internal diameter of the fluid passageway(s) 20 may be on the same order of magnitude as expected depth of UV penetration, though any size and/or shape of fluid passageway(s) 20 may be utilized. In exemplary embodiments, without limitation, the fluid passageways 20 comprise a generally tubular shape having an inner diameter of approximately 1-3 mm, more preferably about 2 mm, and/or an outer diameter of approximately 3-5 mm, more preferably about 4 mm, though any size and/or shape of fluid passageways 20 may be utilized. In the embodiment(s) with helically shaped fluid passageways 20 about the light source(s) 22, such as illustrated with regard to FIG. 4 and FIG. 5 by way of non-limiting example, the coil diameter may be approximately 15-25 mm, though more preferably about 20.2 mm, with approximately 30-40 windings, though more preferably about 32.25 winding about the light source(s) 22. However, any size, shape, and/or arrangement of fluid passageways 20 may be utilized.

Regardless, the fluid passageways 20 and/or light sources 22 may be arranged or otherwise configured to provide sufficient exposure time and levels to fluid within the passageways 20 prior to entering the laser subsystem 16.

A single fluid passageway 20 and light source 22 may be used. In other exemplary embodiments, without limitation, multiple fluid passageways 20 and/or light sources 22 may be utilized, such as in parallel and/or series with one another in a same or various arrangements. In such embodiments, the multiple fluid passageways 20 and/or light sources 22 may be part of a singular enhancement subsystem 18. Alternatively, or additionally, multiple enhancement systems 18 may be utilized, such as in series or parallel of a same or different type. Where multiple enhancement systems 18 are utilized, multiple sample fluid passageways 14 and/or passageways 20 may be utilized, such as which are maintained separately and/or diverge to enter the various enhancement subsystems 18 and/or are rejoined prior to entering the laser subsystem 16, though such is not required. For example, without limitation, multiple laser subsystems 16 may be utilized.

The fluid passageways 20 may comprise and/or at least primarily comprise one or more UV transparent or translucent materials, such as but not limited to quartz, fused silica, glass, and/or diamond. The structure(s) for the fluid passageways 20 and/or light sources 22 may comprise one or more UV transparent or translucent materials of a same or different type.

Figure 3:
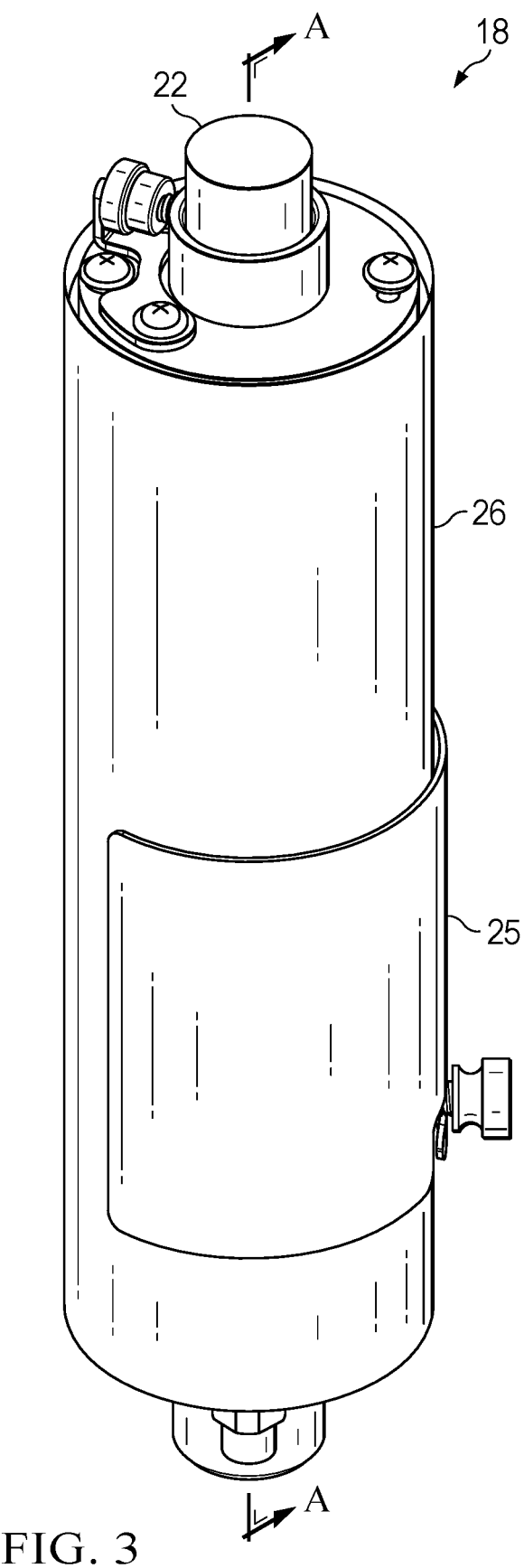
FIG. 3 is a perspective view of an exemplary UV enhancement subsystem for the system of any one of FIGS. 1A-1D.
Figure 4:
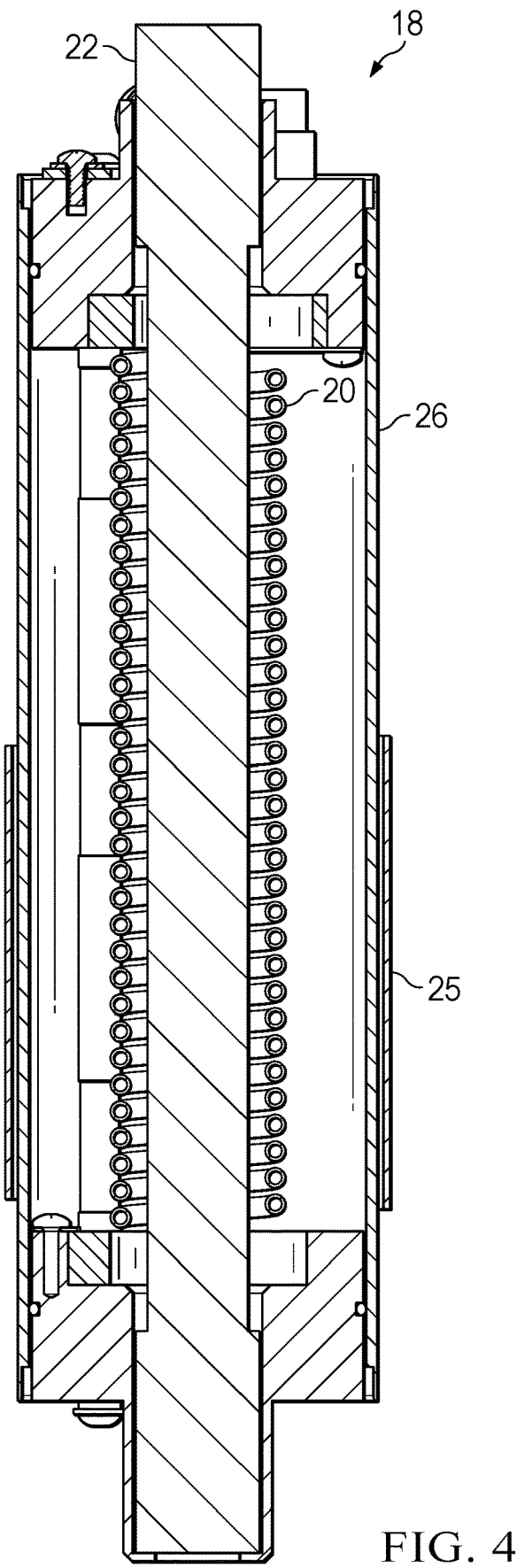
FIG. 4 is a perspective sectional view of the UV enhancement subsystem of FIG. 3 taken along section line A-A of FIG. 3.
Figure 5:
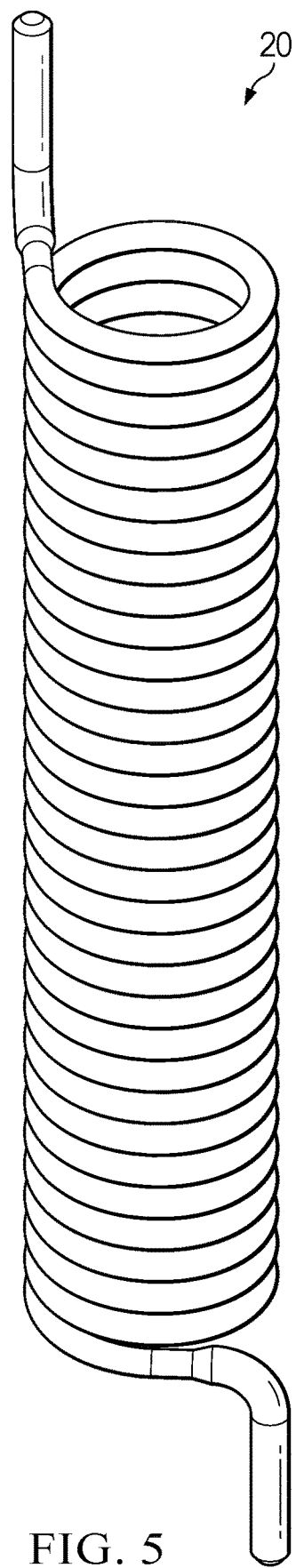
FIG. 5 is a perspective view of an exemplary coil of the UV enhancement subsystem of FIG. 3 illustrated in isolation.
Figure 6:
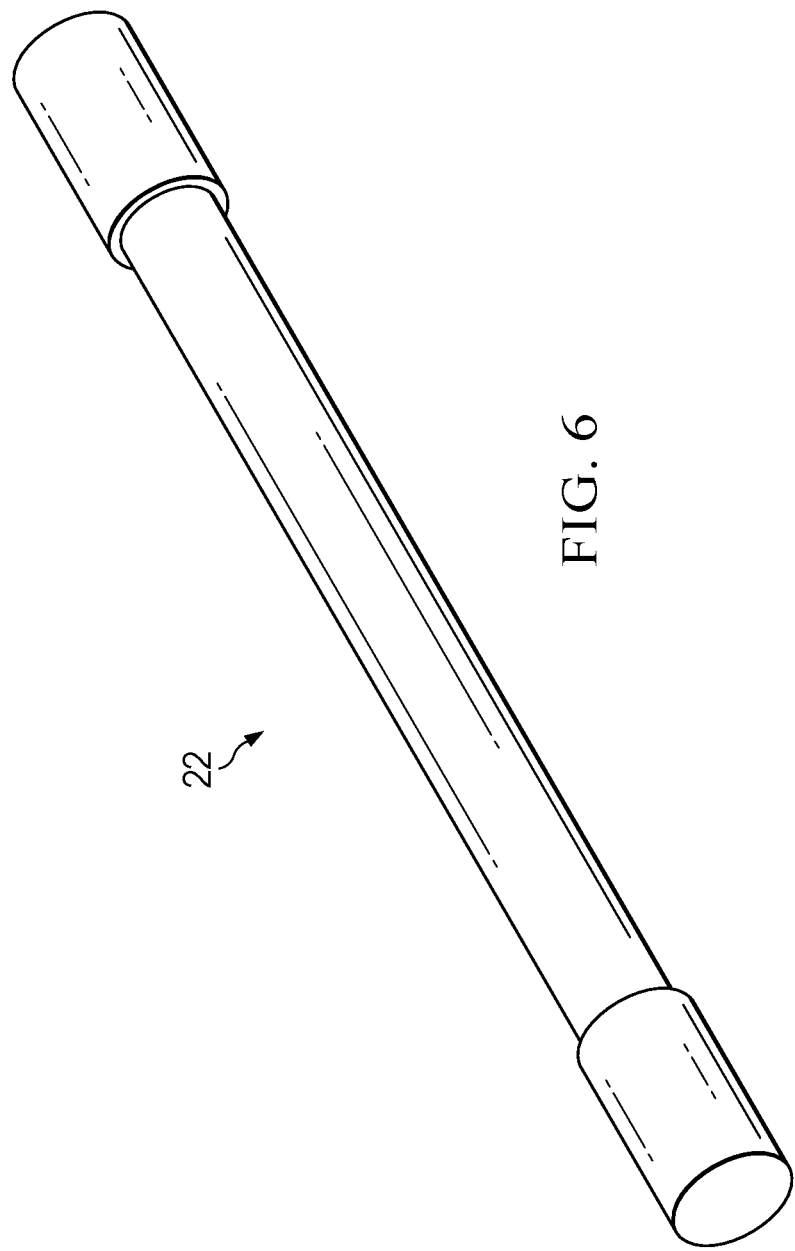
FIG. 6 is a perspective view of an exemplary lighting element of the UV enhancement subsystem of FIG. 3 illustrated in isolation.
Figure 7:
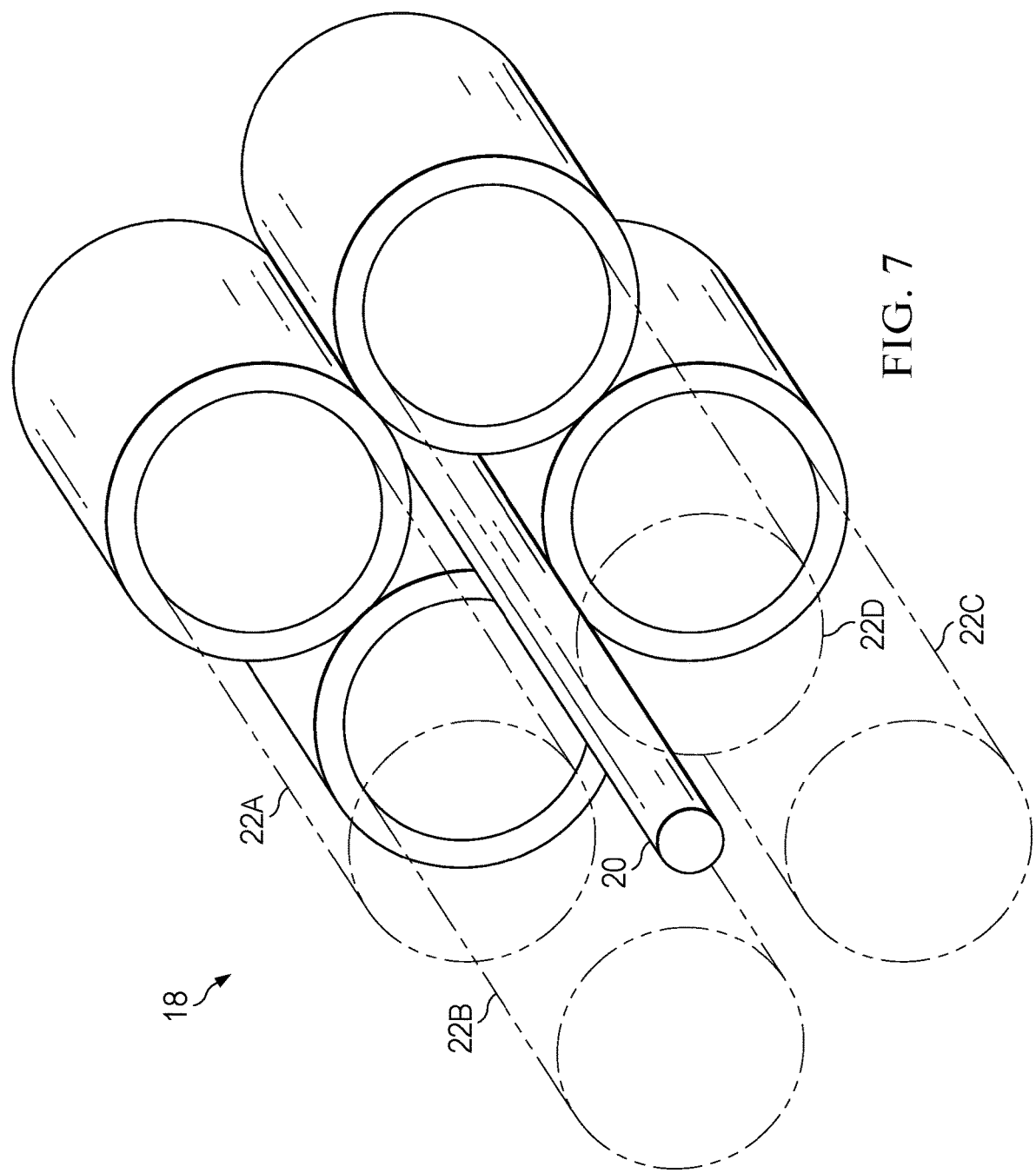
FIG. 7 is a sectional perspective view of another exemplary embodiment of certain components of the UV enhancement subsystem for the system of any one of FIGS. 1A-1D.

As illustrated with particular regard to FIG. 3 and FIG. 4, the fluorescence enhancement subsystem 18 may comprise one or more enclosures 26. The enclosures 26 may surround some or all of at least the light sources 22 and/or the passageways 20. Alternatively, or additionally, the enclosures 26 may protect the light sources 22, fluid passageways 20, and/or other components from outside debris, damage, and/or tampering. The enclosure 26 may be generally cylindrical in shape, though any size and/or shape may be utilized.

The enclosures 26 may be configured to at least partially reflect UV light back towards the fluid passageways 20, thereby increasing dosing. The enclosures 26 may, alternatively or additionally, be configured to shield external components from UV light. The enclosures 26 may comprise one or more UV reflective materials which may also resist UV degradation, such as but not limited to one or more metals and/or glass. In exemplary embodiments, the enclosures 26 may comprise one or more reflective materials on interior or exterior surfaces thereof. The reflective and/or UV depredation resistive materials may be provided on exterior and/or interior surfaces of the enclosure 26, between layers of the enclosure, or integrally formed with the enclosure 26, by way of example, without limitation.

In exemplary embodiments, without limitation, one or more inert materials, such as but not limited to, one or more noble gasses may be provided within the enclosures 26, to reduce or prevent ozone generation. The enclosures 26 may be substantially (e.g., >90%) or fully liquid tight, gas tight, or the like, though such is not required. The enclosures 26 may comprise one or more heat exchangers, fluid purge devices, combinations thereof, or the like, such as for removing air, heat, and/or generated ozone from the enclosures 26.

The enclosures 26 may comprise one or more access panels 25. The enclosures 26 may comprise one or more apertures, such as for the light sources 22, fluid passageways 20, wiring, combinations thereof, or the like. The enclosures 26 may comprise one or more adapters (e.g., hose fittings or couplings) configured to fluidly connect the sample fluid passageway 14 to the internal fluid passageways 20, though such is not necessarily required. The enclosures 26 may comprise one or more removable and/or movable portions, such as for accessing internal portions thereof, and/or components such as the light sources 22 and/or the fluid passageways 20.

Figure 9:
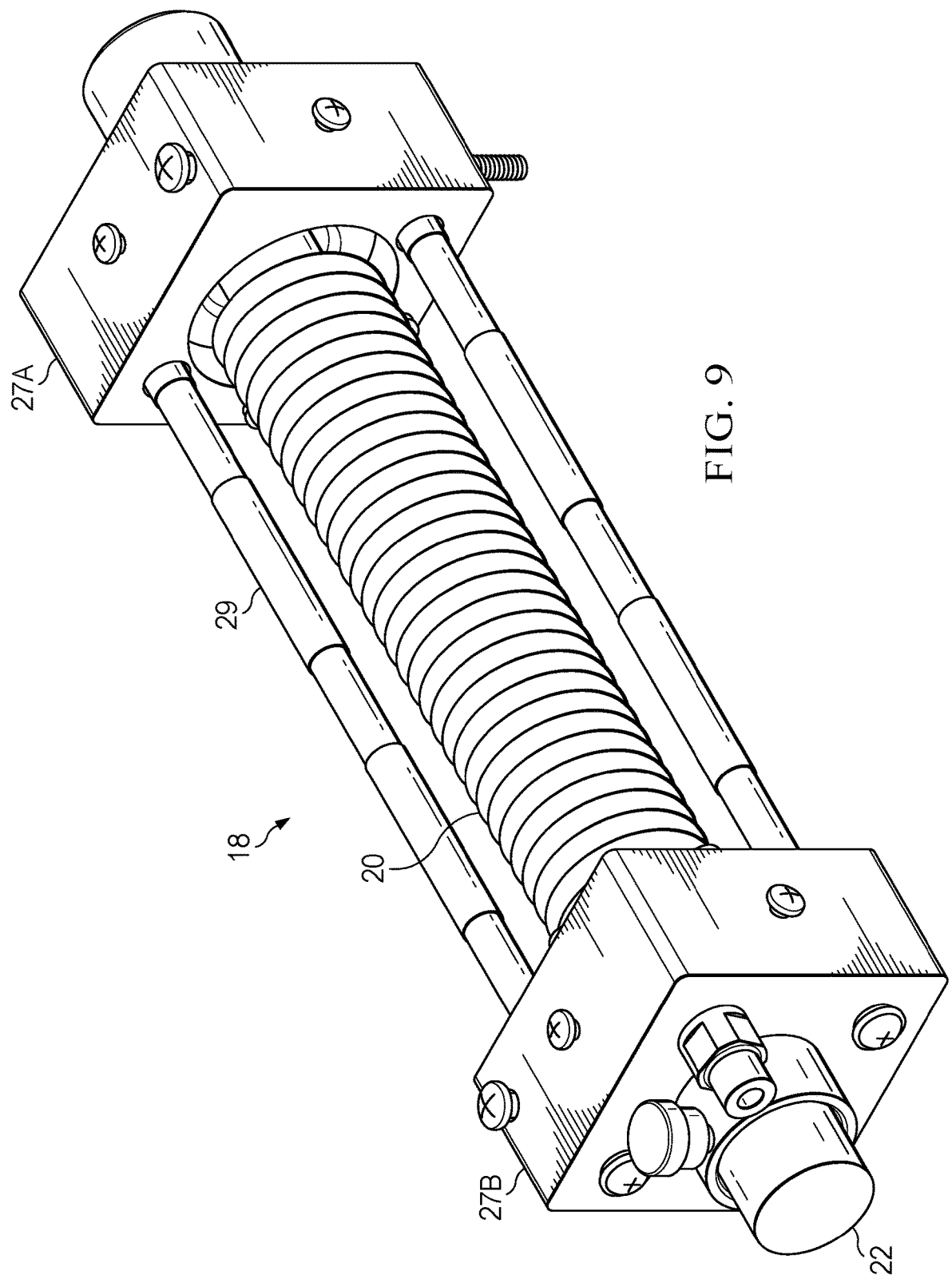
FIG. 9 is a perspective view of another exemplary embodiment of certain components of the UV enhancement subsystem for the system of any one of FIGS. 1A-1D.

As illustrated with particular regard to FIG. 9 other enclosures 26 shapes and/or support structure arrangements may be utilized for the fluorescence enhancement subsystem 18. These may include upper and lower supports 27A, 27B and connecting members 29 extending therebetween. The upper and lower supports 27A, 27B may hold the fluid passageway 20 and/or the light source 22. The enclosure 26 may form a generally cuboidal shape, though any size and/or shape enclosure may be utilized. Outer walls of the enclosure are not illustrated in FIG. 9 so that internal, structural components (e.g., members 29) are visible.

The fluorescence enhancement subsystem 18 may be configured to cause or increase fluorescence in microbes in fluid in the passageways 20, such as by itself and/or in combination with excitation by the laser subsystem 16 for subsequent detection, such as at the laser subsystem 16. The fluorescence enhancement subsystem 18 and laser subsystem 16 may be provided within one or more common structures and/or enclosures, though such is not required.

Figure 10:
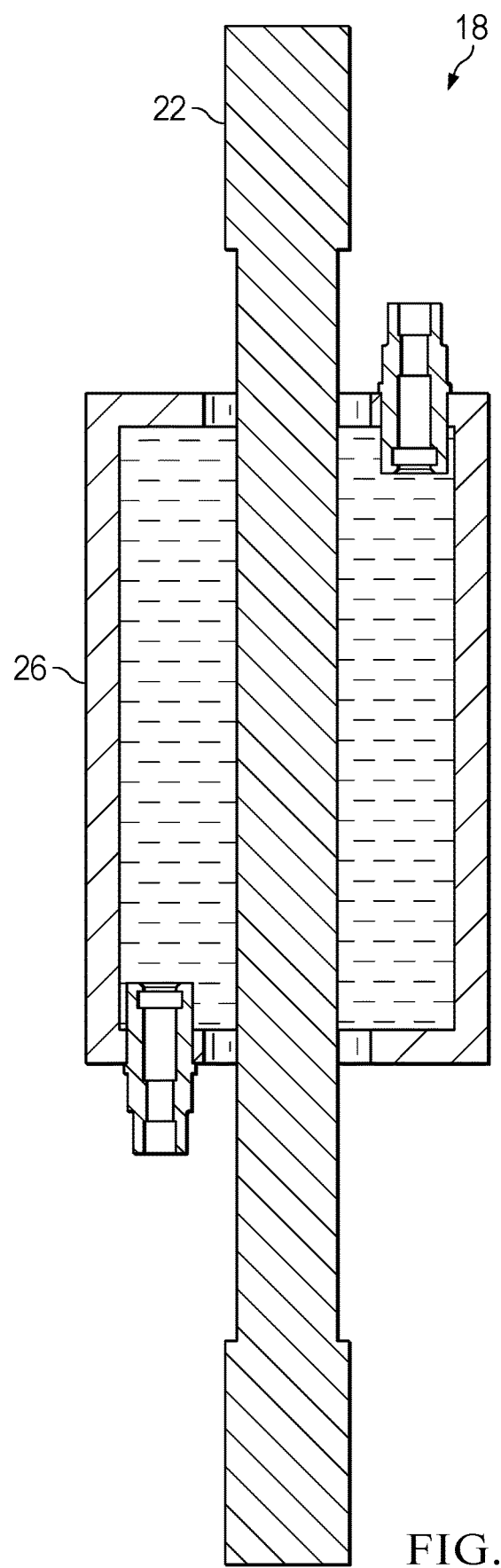
FIG. 10 is a sectional view of another exemplary embodiment of certain components of the UV enhancement subsystem for the system of any one of FIGS. 1A-1D.

FIG. 10 illustrates another exemplary embodiment of the fluorescence enhancement subsystem 18. The enclosure 26 may be substantially or fully fluid tight so as to contain a bath of fluid transported into the enclosure 26, such as by way of one or more entry and/or drain points. The light source(s) 22 may extend through some or all of the enclosure 26 for irradiating the fluid therein. This may bring the fluid in closer proximity to the light source(s) 22, thereby increasing the exposure.

Figure 11:
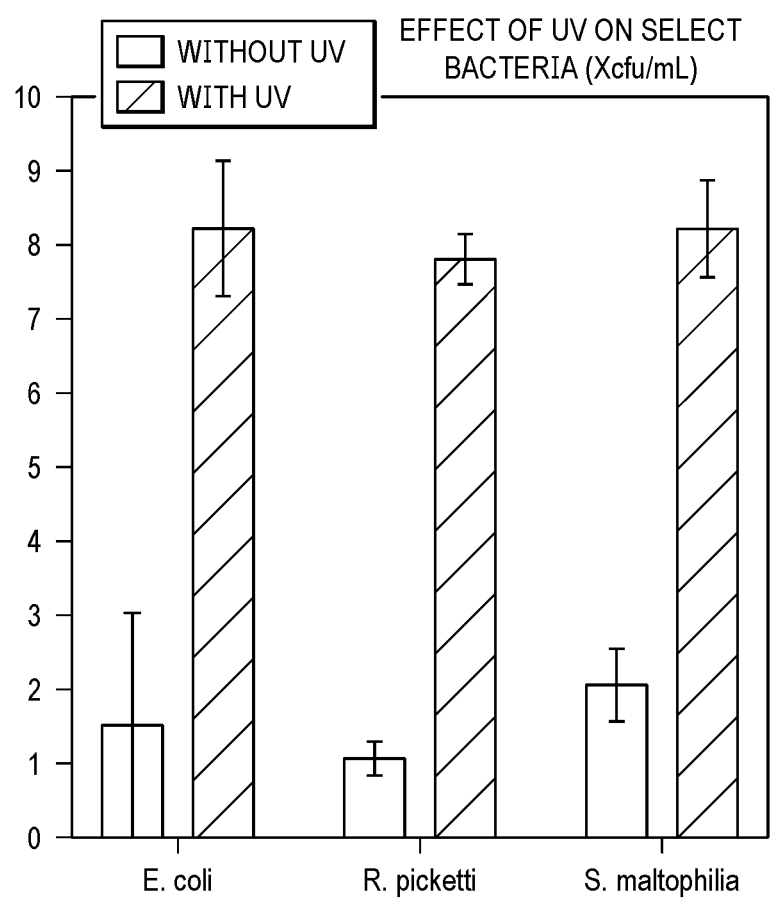
FIG. 11 is a graphical representation of exemplary results from the system compared to non-UV enhanced analysis.

Exemplary results of bioburden analysis with and without UV enhancement are provided in FIG. 11 and FIG. 12 by way of non-limiting examples. The types and/or kinds of organisms identified are merely exemplary and are not intended to be limiting. Those of ordinary skill in the art will appreciate the number and type of organism and/or particulate that may be identified using the system 10. Advantageously, the fluorescence enhancement subsystem 18 may not substantially (or at all) impact of fluorescence of certain particulate, such as but not limited to relatively common non-organic particulate rouge and microplastics. This may be particularly advantageous as such other particulate is otherwise generally susceptible to fluorescence when exposed to laser excitement. Thus, the system 10 may increase the signal to noise ratio, thereby improving accuracy of readings, over laser excitation alone. Any type or kind of fluid may be analyzed, such as with microbial counts as low as 1 unit/mL and/or up to 1000 units/mL, though any level of bioburden may be analyzed.

Readings from the laser subsystem 16 may be recorded and/or presented in substantially real time. As used in this regard, the term substantially may include normal signal transmission and processing times. The results may be presented at the device 12, such as at one or more local displays, recorded at one or more remote databases, and/or reported at one or more remote devices. Summary reports may be generated with such information, such as time dependent graphs. Electronic notifications may be automatically generated when one or more predetermined thresholds are exceeded, which may comprise user-defined preferences. Protocols may be automatically initiated when the one or more predetermined thresholds are exceeded.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A bioburden analysis system comprising:
a passageway for a flow of a fluid, wherein at least a first portion of the passageway at least primarily comprises a UV transparent or translucent material;
an ultraviolet (UV) light source positioned along the first portion of the passageway for irradiating particulate within the fluid with UV light when activated, wherein the UV light source emits UV light when activated; and
a laser subsystem positioned along a second portion of the passageway downstream of the first portion of the passageway, said laser subsystem comprising:
at least one laser for exciting the particulate within the fluid; and
at least one photo detector for measuring fluorescence of the particulate within the fluid;
wherein:
the first portion of the passageway comprises multiple windings helically arranged about the UV light source; or
the UV light source comprises multiple lighting elements, each configured to produce UV light, the first portion of the passageway extends in a linear fashion adjacent to each of the multiple lighting elements, and the multiple lighting elements are arranged in a helical fashion about the first portion of the passageway.

2. The bioburden analysis system of claim 1 wherein:
the first portion of the passageway is located less than 10 mm from the UV light source.

3. The bioburden analysis system of claim 2 wherein:
the first portion of the passageway comprises an internal diameter on a same order of magnitude as a depth of the UV penetration from the UV light source when activated.

4. The bioburden analysis system of claim 2 wherein:
the UV transparent or translucent material comprises fused silica or quartz.

5. The bioburden analysis system of claim 2 wherein:
the first portion of the passageway is configured to provide a flow rate of the fluid from about 0.01 µL/min to about 500 mL/min.

6. The bioburden analysis system of claim 2 wherein:
the first portion of the passageway is configured to maintain the fluid within irradiation distance of the UV light source for a time period from about 5 to 90 seconds.

7. The bioburden analysis system of claim 2 wherein:
the UV light source is part of an enhancement subsystem and is controlled to provide discontinuous light.

8. The bioburden analysis system of claim 1 wherein:
the passageway comprises a sample line extending from a main fluid passageway forming part of a larger system; and
the system is configured to accommodate a continuous flow of the fluid through the sample line.

9. The bioburden analysis system of claim 8 further comprising:
a controller configured to receive fluorescence data from the laser subsystem and record bioburden levels in a continuous manner in substantially real-time for the continuous flow of the fluid through the sample line using a pre-programmed signal threshold for bioburden detection based on laser excitation by the laser subsystem following exposure to the UV light from the UV light source which is different from a signal threshold for detecting a same type or types of bioburden using the bioburden analysis system and exposing the same type or types of bioburden to laser excitation by the laser subsystem without prior exposure to the UV light from the UV light source.

10. The bioburden analysis system of claim 1 wherein:
the passageway comprises, or is connected to, at an input end thereof, a storage tank for the fluid; or
the passageway is connected, at an input end and an output end thereof, to an ambient environment with the fluid.

11. The bioburden analysis system of claim 1 further comprising:
an enclosure provided about the UV light source and the first portion of the passageway, wherein the enclosure comprises one or more UV reflective materials.

12. The bioburden analysis system of claim 1 further comprising:
an enclosure provided about the UV light source, which provides the first portion of the passageway, wherein the enclosure provides a liquid-tight seal for a bath of the fluid and the UV light source extends within at least a portion of the enclosure.

13. A method for detecting biological contamination in a fluid comprising:
providing a sample flow of a fluid within a sample line;
irradiating the sample flow of the fluid with ultraviolet (UV) light from a light source comprising one or more lighting elements positioned along the sample line;
exciting particulate within the sample flow of the fluid by way of a laser positioned downstream of the light source to cause or increase fluorescence of at least microbiological portions of the particulate within the sample flow of the fluid; and
measuring the fluorescence of the particulate within the sample flow of the fluid by way of a photo detector; and
electronically recording detected bioburden levels based, at least in part on the detected levels of the fluorescence of the sample flow of the fluid using a pre-programmed signal threshold for bioburden detection based on laser excitation by the laser subsystem following exposure to the UV light from the UV light source which is different from a signal threshold for detecting a same type or types of bioburden using the bioburden analysis system and exposing the same type or types of bioburden to laser excitation by the laser subsystem without prior exposure to the UV light from the UV light source.

14. The method of claim 13 wherein:
the detected bioburden levels of the sample flow of the fluid are electronically recorded in substantially real time.

15. The method of claim 13 wherein:
the first portion of the sample line is coiled about the light source in a spiral in multiple windings;
a distance between the light source and the sample line is less than 10 mm;
the first portion of the sample feed line coiled about the light source primarily comprises fused silica; and
the sample flow of the fluid is continuous for at least a period of time.

16. A bioburden analysis system comprising:
a passageway for a flow of a fluid, wherein at least a first portion of the passageway at least primarily comprises a UV transparent or translucent material;
an ultraviolet (UV) light source positioned along the first portion of the passageway for irradiating particulate within the fluid with UV light when activated, wherein the UV light source emits UV light when activated;
a laser subsystem positioned along a second portion of the passageway downstream of the first portion of the passageway, said laser subsystem comprising:
at least one laser for exciting the particulate within the fluid; and
at least one photo detector for measuring fluorescence of the particulate within the fluid;
a controller configured to receive fluorescence data from the laser subsystem and record bioburden levels in a continuous manner for the continuous flow of the fluid through the sample line using a pre-programmed signal threshold for bioburden detection based on laser excitation by the laser subsystem following exposure to the UV light from the UV light source which is different from a signal threshold for detecting a same type or types of bioburden using the bioburden analysis system and exposing the same type or types of bioburden to laser excitation by the laser subsystem without prior exposure to the UV light from the UV light source.

17. The bioburden analysis system of claim 16 wherein:
the controller is configured to receive the fluorescence data and record the bioburden levels in substantially real-time.

18. The bioburden analysis system of claim 16 wherein:
the first portion of the passageway comprises multiple windings helically arranged about the UV light source; or
the UV light source comprises multiple lighting elements, each configured to produce UV light, the first portion of the passageway extends in a linear fashion adjacent to each of the multiple lighting elements, and the multiple lighting elements are arranged in a helical fashion about the first portion of the passageway.

19. The bioburden analysis system of claim 18 wherein:
the first portion of the passageway is located less than 10 mm from the UV light source; and
the first portion of the passageway comprises an internal diameter on a same order of magnitude as a depth of the UV penetration from the UV light source when activated.

20. The bioburden analysis system of claim 19 wherein:
the first portion of the passageway is configured to provide a flow rate of the fluid from about 0.01 µL/min to about 500 mL/min; and
the first portion of the passageway is configured to maintain the fluid within irradiation distance of the UV light source for a time period from about 5 to 90 seconds.

* * * * *